United States Patent Office 3,636,050
Patented Jan. 18, 1972

3,636,050
N-BENZOTHIENYLCHLOROACETAMIDES
Patrick R. Driscoll, Fords, and Harold A. Kaufman,
Piscataway, N.J., assignors to Mobil Oil Corporation
No Drawing. Original application Feb. 7, 1968, Ser. No.
703,567, now Patent No. 3,495,967, dated Feb. 17,
1970. Divided and this application Oct. 10, 1969, Ser.
No. 870,773
Int. Cl. C07d 63/72
U.S. Cl. 260—330.5
2 Claims

ABSTRACT OF THE DISCLOSURE

N-benzothienyl-2-chloroacetamide and ring- and N-substituted derivatives thereof are new compounds that are herbicides, particularly as pre-emergent herbicides.

REFERENCE TO RELATED APPLICATIONS

This application is a division of copending application Ser. No. 703,567 filed Feb. 7, 1968, now U.S. Pat. No. 3,495,967, issued Feb. 17, 1970.

FIELD OF THE INVENTION

This invention is concerned with herbicides. It is more particularly concerned wtih a novel class of N-benzothienylchloroacetamide herbicides.

BACKGROUND OF THE INVENTION

There have been proposed, as herbicides, N-naphthyl-2-chloroacetamides having a tertiary ($C_4$–$C_{10}$) alkyl substituent in the 2-position of the naphthyl ring. Insofar as is now known chloroacetamides of heterocyclic compounds, particularly of benzothiophene, have not been proposed.

SUMMARY OF THE INVENTION

This invention provides N-benzothienyl-2-chloroacetamides having the formula:

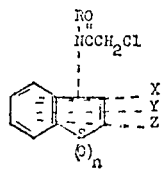

wherein R is selected from hydrogen, alkyl ($C_1$–$C_4$), cycloalkyl ($C_3$–$C_6$), and alkenyl ($C_2$–$C_4$); X, Y, and Z are selected from hydrogen, alkyl ($C_1$–$C_3$), cycloalkyl ($C_3$–$C_6$), aryl, haloaryl, cyano, halogen, carboxy, thiocyano, alkoxy ($C_1$–$C_4$), alkylthio ($C_1$–$C_4$), and nitro; $n$ is 0, 1, or 2; and in which

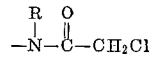

X, Y, and Z may be on any separate 2–7 positions of the ring. This invention also provides a method for controlling plant growth with said N-benzothienyl-2-chloroacetamides.

DESCRIPTION OF SPECIFIC EMBODIMENTS

The aforedefined N-benzothienyl-2-chloroacetamides of this invention are prepared by usual methods of amide formation. Thus, aminobenzothiophene, ring-substituted derivatives, N-substituted, or both ring- and N-substituted derivatives (i.e. an "aminobenzothiophene reactant") can be reacted with chloroacetic acid anhydride with slight warming. The chloroacetamides can also be prepared by reacting the aminobenzothiophene reactant with chloroacetyl chloride, using pyridine or other acid acceptor to neutralize the HCl evolved. Less suitably, the aminobenzothiophene reactant can be reacted with chloroacetic acid, using benzene or toluene to remove water of condensation by azeotropic distillation.

The aminobenzothiophene reactant is a compound having the formula:

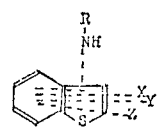

wherein R, X, Y, and Z are as aforedefined and may be on any separate 2–7 positions of the ring. The aminobenzothiophenes can be prepared by various methods known in the art, such as by reduction of the corresponding nitro compound. Typical methods for preparing aminobenzothiophenes and hydroxybenzothiophenes are described by Fries et al., Ann., 527, 83–114 (1937). The aminobenzothiophenes can also be prepared by the well-known "reverse" Bucherer reaction from the hydroxybenzothiophenes. The N-substituted (alkyl, cycloalkyl, and alkenyl) derivatives of the aminobenzothiophenes can be prepared by any of the known alkylation and alkenylation methods. The 1-oxides and 1,1-dioxides can be prepared by reacting the aminobenzothiophene reactant with hydrogen peroxide. It is preferred, however, to convert to the 1-oxide or 1,1-dioxide after preparation of the chloroacetamide. Non-limiting examples of the aminobenzothiophene reactant are:

3-phenyl-6-aminobenzothiophene
3-phenyl-6-amino-7-bromobenzothiophene
4-iodo-5-aminobenzothiophene
3-nitro-4-bromo-5-aminobenzothiophene
5-aminobenzothiophene
2-carboxy-5-aminobenzothiophene 4-aminobenzothiophene
3-aminobenzothiophene
7-aminobenzothiophene
4-amino-6-methylbenzothiophene
3-amino-7-isopropoxybenzothiophene
4-amino-2-ethylbenzothiophene
4-amino-7-methylthiobenzothiophene
4-amino-5-allylbenzothiophene
4-amino-7-cyclopropylbenzothiophene
2-cyano-4-aminobenzothiophene
7-thiocyano-4-aminobenzothiophene
2-chloro-4-aminobenzothiophene
2,3-dichloro-4-aminobenzothiophene
1,1-dioxy-4-aminobenzothiophene
1-oxy-3-aminobenzothiophene
N-methyl-4-aminobenzothiophene
N-methyl-2-carboxy-5-aminobenzothiophene
N-isopropyl-4-aminobenzothiophene
N-isopropyl-5-aminobenzothiophene
N-isopropyl-7-aminobenzothiophene
N-isopropyl-3-nitro-4-bromo-5-aminobenzothiophene
N-vinyl-2-ethyl-4-aminobenzothiophene
N-vinyl-7-methylthio-4-aminobenzothiophene
N-cyclopropyl-5-allyl-4-aminobenzothiophene
N-cyclopropyl-4-aminobenzothiophene
N-butenyl-4-aminobenzothiophene
N-butenyl-7-cyclopropyl-4-aminobenzothiophene The following are typical of the compounds of this invention:

N-(3-phenyl-6-benzothienyl)-chloroacetamide
N-(3-phenyl-7-bromo-6-benzothienyl)-chloroacetamide
N-(4-iodo-5-benzothienyl)-chloroacetamide
N-(3-nitro-4-bromo-5-benzothienyl)-chloroacetamide
N-(5-benzothienyl)-chloroacetamide
N-(2-carboxy-5-benzothienyl)-chloroacetamide
N-(4-benzothienyl)-chloroacetamide
N-(2-benzothienyl)-chloroacetamide
N-(3-benzothienyl)-chloroacetamide
N-(7-benzothienyl)-chloroacetamide
N-(6-methyl-4-benzothienyl)-chloroacetamide
N-(7-isopropoxy-3-benzothienyl)-chloroacetamide
N-(2-ethyl-4-benzothienyl)-chloroacetamide
N-(7-methylthio-4-benzothienyl)-chloroacetamide
N-(5-allyl-4-benzothienyl)-chloroacetamide
N-(7-cyclopropyl-4-benzothienyl)-chloroacetamide
N-(2-cyano-4-benzothienyl)-chloroacetamide
N-(7-thiocyano-4-benzothienyl)-chloroacetamide
N-(2-chloro-4-benzothienyl)-chloroacetamide
N-(2,3-dichloro-4-benzothienyl)-chloroacetamide
N-(1,1-dioxy-4-benzothienyl)-chloroacetamide
N-(1-oxy-3-benzothienyl)-chloroacetamide
N-methyl-N-(4-benzothienyl)-chloroacetamide
N-methyl-N-(2-carboxy-5-benzothienyl)-chloroacetamide
N-isopropyl-N-(4-benzothienyl)-chloroacetamide
N-isopropyl-N-(5-benzothienyl)-chloroacetamide
N-isopropyl-N-(2-benzothienyl)-chloroacetamide
N-isopropyl-N-(7-benzothienyl)-chloroacetamide
N-isopropyl-N-(3-nitro-4-bromo-5-benzothienyl)-chloroacetamide
N-vinyl-N-(2-ethyl-4-benzothienyl)-chloroacetamide
N-vinyl-N-(7-methylthio-4-benzothienyl)-chloroacetamide
N-cyclopropyl-N-(5-allyl-4-benzothienyl)-chloroacetamide
N-cyclopropyl-N-(4-benzothienyl)-chloroacetamide
N-butenyl-N-(4-benzothienyl)-chloroacetamide
N-butenyl-N-(7-cyclopropyl-4-benzothienyl)-chloroacetamide

EXAMPLE

N-isopropyl-4-aminobenzothiophene (B.P. 114° C./0.5 mm.) was prepared by alkylating 4-aminobenzothiophene with propylene. A mixture of 5.0 g. (0.026 mole) of N-isopropyl-4-aminobenzothiophene and 8.9 g. (0.052 mole) of chloroacetic acid anhydride was warmed for 2 hours. The mixture was then cooled and poured onto 50 g. of ice. The brown solid that separated was filtered off and recrystallized from 1:1 ethanol-water. A white solid was obtained weighing 5.2 g. (74.7% yield) and melting at 106.5–108° C. Infrared and Nuclear Magnetic Resonance data support the structure for N-isopropyl-N-(4-benzothienyl) chloroacetamide.

The compounds of this invention can be applied in various ways to achieve herbicidal action. They can be applied, per se, as solids or in vaporized form, but are preferably applied as the toxic components in pesticidal compositions of the compound and a carrier. The compositions can be applied, as dusts; as liquid sprays, or as gas-propelled sprays and can contain, in addition to a carrier, additives such as emulsifying agents, binding agents, gases compressed to the liquid state, odorants, stabilizers, and the like. A wide variety of liquid and solid carriers can be used. Non-limiting examples of solid carriers include talc, bentonite, diatomaceous earth, pyrophyllite, fullers earth, gypsum, flours derived from cottonseeds and nut shells, and various natural and synthetic clays having a pH not exceeding about 9.5. Non-limiting examples of liquid carrier include water; organic solvents such as alcohols, ketones, amides and esters; mineral oils such as kerosene, light oils, and medium oils; and vegetable oils such as cottonseed oil.

In practice, herbicidal application is measured in terms of pounds of herbicide applied per acre. The compounds of this invention are effective herbicides when applied in herbicidal amounts, i.e., at rates between about 0.2 pound and about 10 pounds per acre.

HERBICIDAL EFFECTIVENESS

Method of propagating test species

Crabgrass—*Digitaria sanguinalis*
Yellow Foxtail grass—*Setaria glauca*
Johnson grass—*Sorghum halepense*
Barnyard grass—*Echinochloa crus-galli*
Amaranth pigweed—*Amaranthus retroflexus*
Turnip—*Brassica* sp.
Cotton—*Gossypium hirsutum* var. DPL smooth leaf
Corn—*Zea mays* var. Golden Bantam
Bean—*Phaseolus vulgaris* var. Black Valentine All crop and weed species are planted individually in 3" plastic pots containing potting soil. Four seeds each of corn, cotton, and snapbeans are seeded to a depth equal to the diameter of the seed. All other species are surface seeded and sprinkled with screened soil in an amount sufficient to cover the seed. Immediately after planting, all pots are watered by sub-irrigation in greenhouse trays. Pots for the pre-emergence phase are seeded one day before treatment.

Planting dates for the post-emergence phase are varied so that all seedlings will reach the desired stage of development simultaneously. The proper stage of seedling development for treatment in the post-emergence phase is as follows:

Grasses: 2" in height.
Pigweed and turnips: 1 or 2 true leaves visible above cotyledons.
Cotton: first true leaf 1" in length; expanded cotyledons.
Corn: 3"–4" in height.
Beans: primary leaves expanded, growing point at primary leaf node.

Method of treatment

Spray applications are made in a hood containing a movable belt and fixed spray nozzle. For passage through the spray hood, one pot of each species (pre-emergence phase) is placed on the forward half of a wooden flat and one pot of established plants (post-emergence phase) is placed on the rear half of the flat. Treatments are moved to the greenhouse after spraying. Watering during the observation period is applied only by sub-irrigation.

Compounds are screened at a rate of application equivalent to 8 lbs. per acre. Two weeks after treatment the percent pre- and post-emergent injury is visually rated. Herbicidal testing of N-isopropyl-N-(4-benzothienyl) chloroacetamide showed the following results:

| Plant | Percent injury | |
| --- | --- | --- |
|  | Pre-emergent | Post-emergent |
| Crabgrass | 90 | 40 |
| Yellow foxtail | 90 | 50 |
| Johnson grass | 60 | 30 |
| Barnyard grass | 90 | 60 |
| Pigweed | 80 | 20 |
| Turnip | 50 | 60 |
| Cotton | 30 | 80 |
| Corn | 0 | 20 |
| Bean | 0 | 40 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. An N-benzothienyl-2-chloroacetamide having the formula:

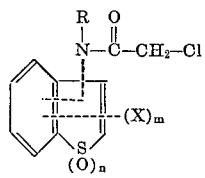

wherein R is selected from hydrogen, alkyl ($C_1$–$C_4$), cycloalkyl ($C_3$–$C_6$), and alkenyl ($C_2$–$C_4$); X is selected from hydrogen, alkyl ($C_1$–$C_3$), cycloalkyl ($C_3$–$C_6$), phenyl, cyano, halogen, carboxy, thiocyano, alkoxy ($C_1$–$C_4$), alkylthio ($C_1$–$C_4$), allyl, and nitro; $n$ is 0, 1, or 2; $m$ is 1 or 2; and in which

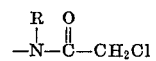

and X may be on any separate 2–7 positions of the ring.

2. N-isopropyl-N-(4-benzothienyl)-chloroacetamide.

References Cited
UNITED STATES PATENTS 3,255,247   6/1966   Olin _____ 260—562

HENRY R. JILES, Primary Examiner

C. M. SHURKO, Assistant Examiner